Aug. 25, 1970   E. D. GRANT, JR   3,525,596
CONTROLLED DISCHARGE MEANS FOR REACTION APPARATUS
Filed Feb. 1, 1966   3 Sheets-Sheet 1

United States Patent Office 3,525,596
Patented Aug. 25, 1970

3,525,596
CONTROLLED DISCHARGE MEANS FOR
REACTION APPARATUS
Edward D. Grant, Jr., Baton Rouge, La., assignor, by mesne assignments, to Chemetron Corporation, Chicago, Ill., a corporation of Delaware
Filed Feb. 1, 1966, Ser. No. 524,001
Int. Cl. B65g 53/40; B01j 3/02
U.S. Cl. 23—290
4 Claims

ABSTRACT OF THE DISCLOSURE

Apparatus for removing continuously a discharge from a high pressure reaction chamber without substantial reduction in pressure wherein pressure control means act on an unloading chamber to regulate the volume thereof yet permit the high pressure to force discharge into the unloading chamber in spite of the positive pressure control means. An outlet channel interconnects the reaction chamber and the unloading chamber and valve means prevent flow or provide communication between the reaction chamber and the unloading chamber, the valve means also providing free passage of discharge from the unloading chamber through a discharge channel when flow between the reaction chamber and the unloading chamber is stopped. In a preferred embodiment, sensing means are connected to the pressure control means to sequentially open and close the valve means in the described manner.

This invention relates to a continuous production reactor for use in chemical processes in which the reactants must be combined under pressure and the pressure must be maintained in the reaction chamber even while the product is being removed. In particular, the invention relates to the product-removal section of apparatus which is especially suited to form a slurry product having a large proportion of solids from a high pressure, high temperature chamber.

The withdrawal of a reaction product from a high pressure chamber without reducing the pressure below tolerable limits presents many difficulties, especially if the removal must be accomplished without permitting the escape of reactants that have been only partially combined and if the withdrawal is to take place as part of a continuous production cycle in which fresh reactants may be admitted to the chamber at substantially the same time that the end product is being removed.

The present invention avoids or overcomes these difficulties by means of a simple reaction chamber and discharge arrangement. The discharge section includes an unloading chamber connected to the outlet channel of the reaction chamber to receive the reaction product. Valve means are provided to direct the product into the unloading chamber, which has pressure means associated with it to maintain a high pressure on the reaction product as it leaves the reaction chamber, and subsequently to close off the flow of the product from the reaction chamber and to open a discharge channel from the unloading chamber to receptacles for the product or to other channels for transmitting the product away from the unloading chamber.

In one embodiment of the reaction apparatus, the valve means include one valve connected in the outlet channel between the reaction chamber and the unloading chamber and another valve connected in the discharge channel of the unloading chamber. The first valve is referred to as a filling valve while the other is called an emptying valve, these designations having reference to their use in filling and emptying the unloading chamber. When the emptying valve is closed and the filling valve is open, reaction product is able to flow into the unloading chamber from the reaction chamber. The unloading chamber is in the form of a cylinder with a piston that moves back under pressure of the incoming reaction product but is prevented from moving back so rapidly as to reduce the pressure too much in the reaction chamber. The force applied to the back side of the piston to prevent it from receding too rapidly is preferably produced by a substantially incompressible fluid controlled by automatic means to allow the unloading chamber to receive a new charge of the product at the proper times to maintain the production cycle.

After the unloading chamber has received a sufficient quantity, the filling valve is automatically closed and the emptying valve is opened. Pressure is then applied to force the piston forward and thus to force the reaction product out through the emptying valve. There is usually no further need to maintain pressure on the product, which may therefore be directed into containers or into conduits leading away from the reactor.

The invention will be described in greater detail hereinafter in connection with the drawings, in which.

Figure 1:
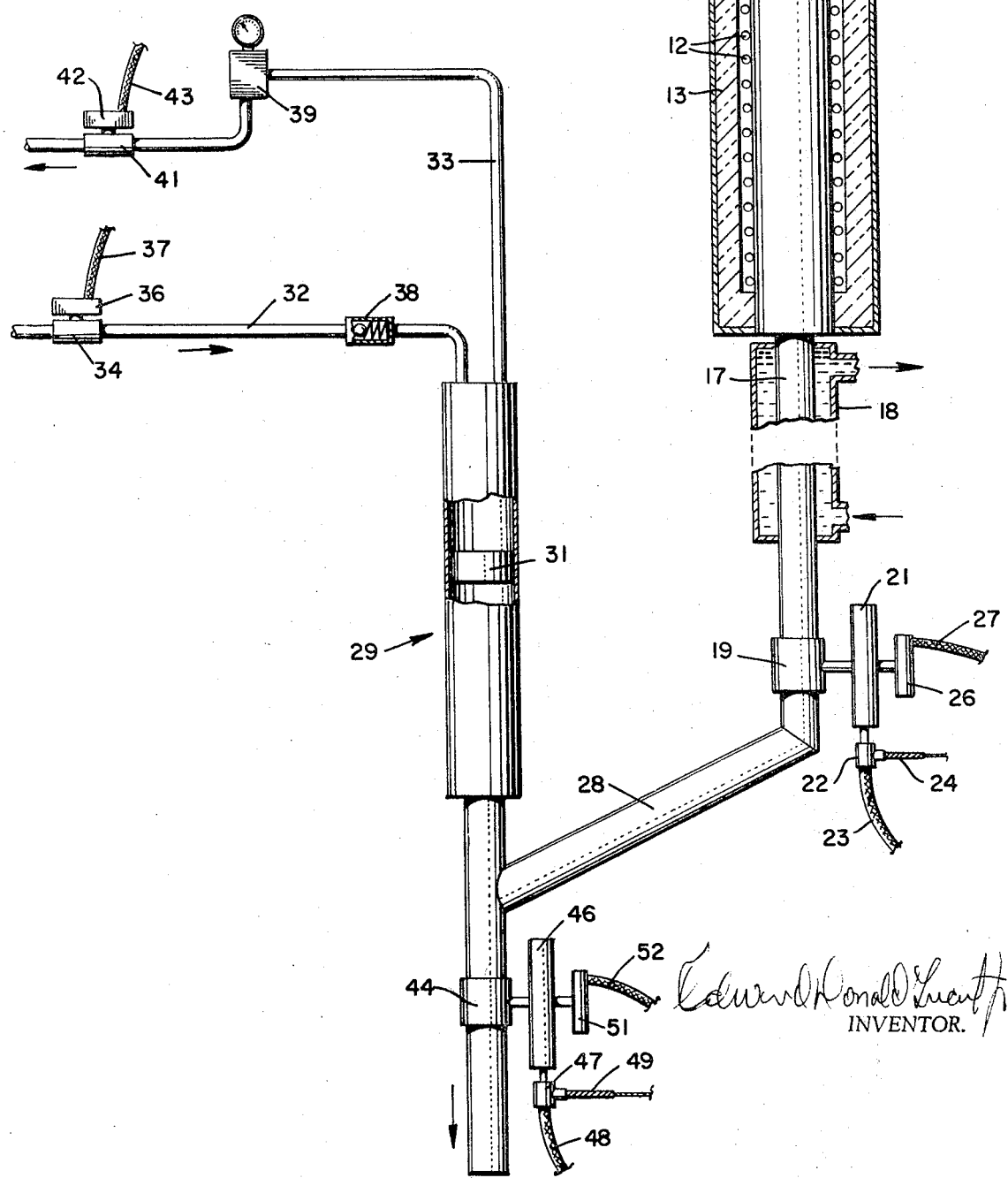
FIG. 1 is a simplified view of a reactor constructed according to the invention.

The apparatus shown in FIG. 1 comprises a relatively high temperature, high pressure reaction chamber 11 consisting, in this embodiment, of a four inch Monel pipe surrounded by auxiliary heaters 12 and an insulating jacket 13. Near the upper end of the pipe is an inlet through which the chamber is charged with one chemical through an inlet pipe 14 and with another chemical through a second pipe 16. For better mixing of the two reactants, the end of the pipe 14 is located concentrically within the pipe 16.

While the reactor is suited to the production of many chemical products, including, among others, tetraethyl lead, the commercial production of which includes the removal of lead sludge from the reaction product mixture under conditions of elevated pressure and temperature, the specific arrangement and operation of components described herein will be related to the manufacture of pyrocatechol, which is produced by admitting chlorophenol liquid through the pipe 14 and an aqueous solution of caustic and a barium salt, preferably the chloride, through the pipe 16. The temperature of the reactants as they enter the chamber 11 is approximately 300° C. and the heaters 12 are set to maintain approximately the same temperature while the reaction is taking place.

At the bottom of the reactor chamber 11 is a two inch Monel pipe 17 surrounded by a water-jacketed cooler 18 to reduce the temperature of the reaction product below about 100° C. Below the water jacket 18 is a valve 19, referred to as a cylinder filling valve, which may be a simple ball valve and is capable of either closing off the pipe 17 or opening it completely to permit the reaction product to pass through. The valve 19 includes an actuator 21 and an actuator air solenoid 22 connected thereto and supplied through an air hose 23. The solenoid is controlled by electrical impulses via an electric cable 24. Position indicator switches are located within a chamber 26 to indicate, by means of signals transmitted through a cable 27 to a control center, whether the valve 19 is open or closed.

Below the valve 19 is an extension 28 of the pipe 17 that leads to an unloading chamber 29, which is another four inch Monel cylinder containing a free piston 31. The upper end of the cylinder 29 is closed except for two fluid operating lines 32 and 33. The line 32 is connected to a water supply source, which may be city water or water at somewhat higher pressure, e.g. about 100 lbs. per square inch. A flow valve 34 is placed at the inlet end of the line 32 to indicate whether water is flowing in that line in the direction of the arrow or not, the indication being converted into electrical signals by a switch assembly 36 and transmitted via a cable 37 to a central control point. The water line 32 also includes a simple ball check valve 38 to prevent water from flowing in the wrong direction in the supply line 32 because of the much higher pressure on the lower surface of the piston 31.

The other water line 33 is the outlet pipe which has a pressure controller 39 to keep this line closed below a certain pre-set pressure. If the pressure in the line 33 exceeds the pre-set pressure value, the back pressure controller 39 opens up and allows the water to escape. Another flow valve 41 is connected in the line 33 to transmit, by way of a switch assembly 42 and an electrical cable 43, a signal indicating whether water is flowing in the line 33 or not.

Below the unloading cylinder 29 is a two inch pipe joined to the pipe 28 in a Y junction. Below the junction is a cylinder emptying valve 44 of the same construction as the valve 19 and provided with a valve actuator 46 controlled by an air cylinder 47 which receives its supply of air through a tube 48 and is controlled by electrical signals transmitted through a cable 49. Position indicator switches are enclosed within a housing 51 to indicate by electrical signals transmitted along a cable 52 whether the valve 44 is open or closed.

Figure 2:
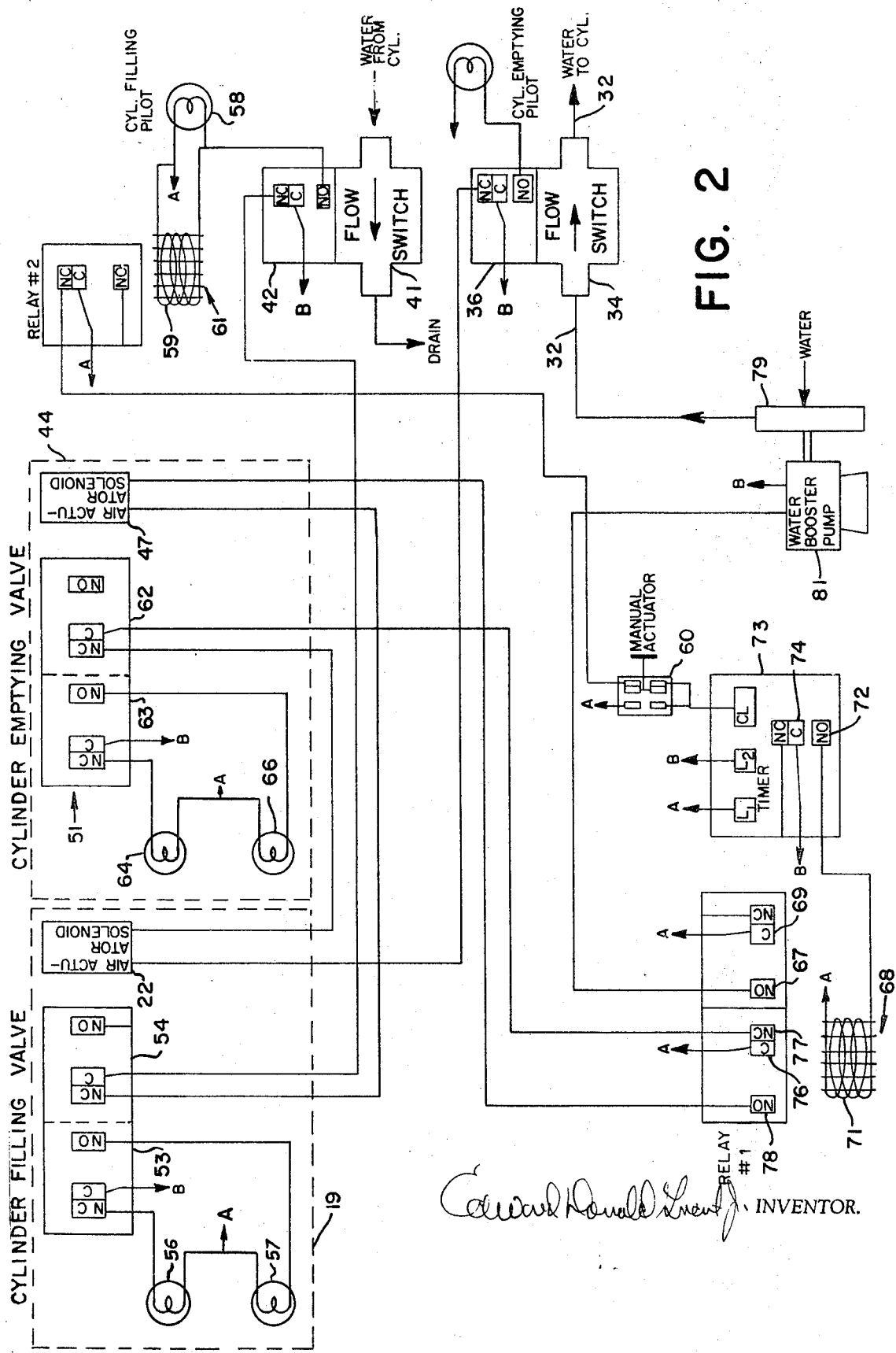
FIG. 2 is an electrical schematic diagram of a circuit for operating the apparatus of FIG. 1.

FIG. 2 is a schematic electrical circuit and flow control diagram to illustrate the operation of the apparatus in FIG. 1. The chamber, or housing, 26 contains two single-pole, double-throw switches 53 and 54 to sense the position of the actuator 21, and in order to interfere as little as possible with the operation of the actuator, these switches may be micro-switches. The switch 53 is referred to as a pilot switch, because its function is merely to operate two indicator lights 56 and 57, which are connected to the normally closed and normally open contacts, respectively, of the switch. Both of the indicator lights are connected to a terminal A of a power supply line, which may be an ordinary 110 volt A.C. line or a D.C. line, and the movable contact of the switch 53 is connected to the opposite terminal B of the power line to form a closed loop through one or the other of the indicator lights, depending on the location of the movable arm of the switch, and, in turn, on the position of the actuator 21.

The safety switch 54 is shown as a single-pole, double-throw type, but only one of its poles is used in this circuit. This is the normally closed contact, and it is connected in series with the air actuator solenoid 47 that controls the cylinder emptying valve 44. The movable contact of the switch 54 is connected to the normally closed contact of the switch assembly 42, which is mechanically connected to the flow valve 41 to be operated when water flows from the unloading cylinder 29. The movable contact of the switch 42 is connected to the B terminal of the supply voltage, while the normally open contact of that switch is connected to a parallel circuit comprising a cylinder filling pilot light 58 and a coil 59 of a relay 61. The other terminal of the parallel circuit is connected to the A terminal of the power line to energize both the light and the relay when the switch 42 is actuated as water flows out of the upper end of the unloading cylinder 29.

The movable arm of the relay 61 is connected to the A terminal of the power line, while the normally closed contact of the relay is connected to one terminal of a manual actuator 60, the purpose of which will be described hereinafter.

One of the terminals of the air actuator solenoid 22 is connected to the normally closed contact of the switch 36 attached to and controlled by the flow valve 34 on the water inlet line 32. The movable arm of the switch is connected to the B terminal of the power line so that operating current is supplied through this switch to the air actuator solenoid 22 when no water is flowing in the inlet water line 32. The solenoid 22 is also connected to a safety switch 62, which is one of two switches in the housing 51 associated with the cylinder emptying valve 44. The other switch in this assembly is a pilot switch 63, which corresponds to the pilot switch 53 associated with the cylinder filling valve 19, and, like switch 53, is connected to two indicator lights 64 and 66 to indicate, respectively, when the movable arm of the switch 63 is in its normal position and when it is in its actuated position. In the normal position the cylinder emptying valve 44 is closed, while in the actuated position of the switch 63, the valve 44 is open.

The safety switch 62 corresponds to the switch 54, and its normally closed contact is connected in series with the air actuator solenoid 22 while its movable contact is connected to one of the normally open contacts 67 of a relay 68. A movable arm 69 makes connection with the contact 67 when the relay is energized by current flowing in its coil 71. One end of the coil is connected to the A terminal, and the other end is connected to a normally open contact 72 of a timer 73. A movable contact 74 makes connection with the contact 72 upon operation of the timer and is connected to the B terminal of the power line to complete the energizing circuit for the relay 68.

The relay 68 also has another bank of contacts, including a movable contact 76 connected to the A terminal of the power line and two fixed contacts 77 and 78 associated therewith. The contact 78 is normally open and is connected to the air actuated cylinder 44, and the contact 77 is normally closed and is connected to the arm of the safety switch 62.

The operation of the apparatus of FIG. 1 will be described in connection with the operation of the circuit in FIG. 2. Assume that at the beginning the apparatus of FIG. 1 is ready to receive its initial charge. In that condition water will have been supplied by the line 32 to the space above the piston 31 in the unloading cylinder 29 so that the piston 31 will be down at the bottom of the cylinder 29. For the manufacture of pyrocatechol, the back pressure controller 39 is selected or is set so that it will open only upon pressure in the range of about 1400 to 1500 lbs. per square inch. The incoming water through the line 32 is supplied at a pressure of about 100 lbs. per square inch. Therefore, the controller 39 effectively blocks any passage of water after the upper part of the cylinder 29 has been filled and the piston 31 has been pushed to the bottom. If it is desired to boost the water pressure from the normal pressure of city water, a water pump 79 operated by a motor 81 may be used. The motor 81 is connected to the normally open contact 67 of the relay 68 so that it operates only when the relay 68 is energized. If the city water pressure is great enough, the pump 79 and its motor 81 may be dispensed with along with the switch bank containing the contacts 67 and 69 of the relay 68.

Initially, the cylinder filling valve 19 will be closed to prevent the charge received through the incoming lines 14 and 16 from passing out of the reactor 11. At the same time the cylinder emptying valve 44 will be open because of the interconnection of switches between the two valves 19 and 44. When the cylinder filling valve 19 is closed, the movable arms of the switches 53 and 54 are as shown in FIG. 2, which means that the pilot light 56 will be on, indicating that the valve 19 is closed, and it further means that current can pass through the switch 54, provided no water is flowing from the unloading cylinder. The lack of flow of water from the unloading cylinder via line 33 is indicated by the fact that the flow valve 41 keeps the switch 42 in its "OFF" position as shown in FIG. 2. Current from the B terminal power supply line passes through the movable arm of the switch 32, through the normally closed contact of that switch, and through the switch 54 to the air actuator solenoid 57. However, this current will flow only if the relay 68 has been actuated by the timer 73 to move the arm 76 into connection with the normally open contact 78.

The ball check valve 38 and the pressure control valve 39 permit the hydraulic system of the unloading chamber to be operated with only low pressure hydraulic fluid even though the unloading chamber is used to remove reaction product at a much higher pressure from the chamber 11. The reason that this is so is that the low pressure fluid supplied to the line 32 ahead of the valve 38 is not obliged to compete with the high pressure reaction product in determining the position of the piston 31. When the reaction product is being forced into the cylinder 29, the valve 19 will be open and the valve 44 will be closed. The pressure on the lower face of the piston 31 is so much higher than the pressure applied by the hydraulic fluid flowing through the line 32 that hydraulic fluid will start to be forced backward in the line 32, closing the valve 38 and effectively cutting off the flow of low pressure hydraulic fluid. Moreover the high pressure applied to the lower surface of the piston 31 will be sufficient to open the valve 39 and permit water trapped in the upper part of the unloading chamber 29 to be driven out through the valve 39 and 41.

The upper movement of the piston 31 can be halted in one of two ways, basically. Either the piston will strike the head of the unloading cylinder 29 or the valve 19 will be closed, preferably the latter, although if the piston strikes the head of the chamber 29, no further hydraulic fluid will be forced out through the sensing valve 41 and this will provide a signal which will in itself close the valve 19 and open the valve 44. Once the valve 19 is closed, no further high pressure will be applied to the lower surface of the piston 31, and once the valve 44 is open, the low pressure hydraulic fluid will again be able to open the ball check valve 38 to force the piston 31 down and the reaction product out of the system through the valve 44.

The re-cycling of the system, that is the transfer of successive batches of the reaction product from the reaction chamber 11 to the discharge chamber 29 and then out through the valve 44, may take place on a timed sequence basis in which the valve 19 may be held closed even after the discharge chamber has been emptied so as to delay long enough for the reaction to take place in the chamber 11 before the reaction product is transferred to the chamber 29. Preferably however, the size and configuration of the reaction chamber and the discharge chamber should be such that the discharge of a new batch of reaction product can take place as soon as the previous batch has been discharged. This is one of the reasons for directing the intake lines 14 and 16 for the reactants to the upper part of the reaction chamber 11. Doing so permits the reaction to take place throughout the height of the reaction chamber to allow the reaction product to settle or flow to the bottom of the chamber as the reaction is completed. It is not necessary of course that the reaction chamber be vertical; it might have any convenient shape and might in fact include a series of separate chambers through which the reactants move as the reaction takes place.

Furthermore, the relative speed of the reaction and capacity of the reaction chamber and discharge chamber may necessitate more than one discharge chamber as, for example, if the discharge had a high sludge content and could only move very slowly into the discharge chamber 29 and then out through the valve 44. In that case, it might be necessary to tap into the pipe 17 above the valve 19 to divert the next batch of reaction product through a valve similar to the valve 19 and into a second discharge chamber. This would also have the advantage that the discharge from the reaction chamber 11 could take place on a more nearly continuous basis, thereby preventing surges through the material in the reaction chamber, as might occur if the flow were halted abruptly from time to time.

Figure 3:
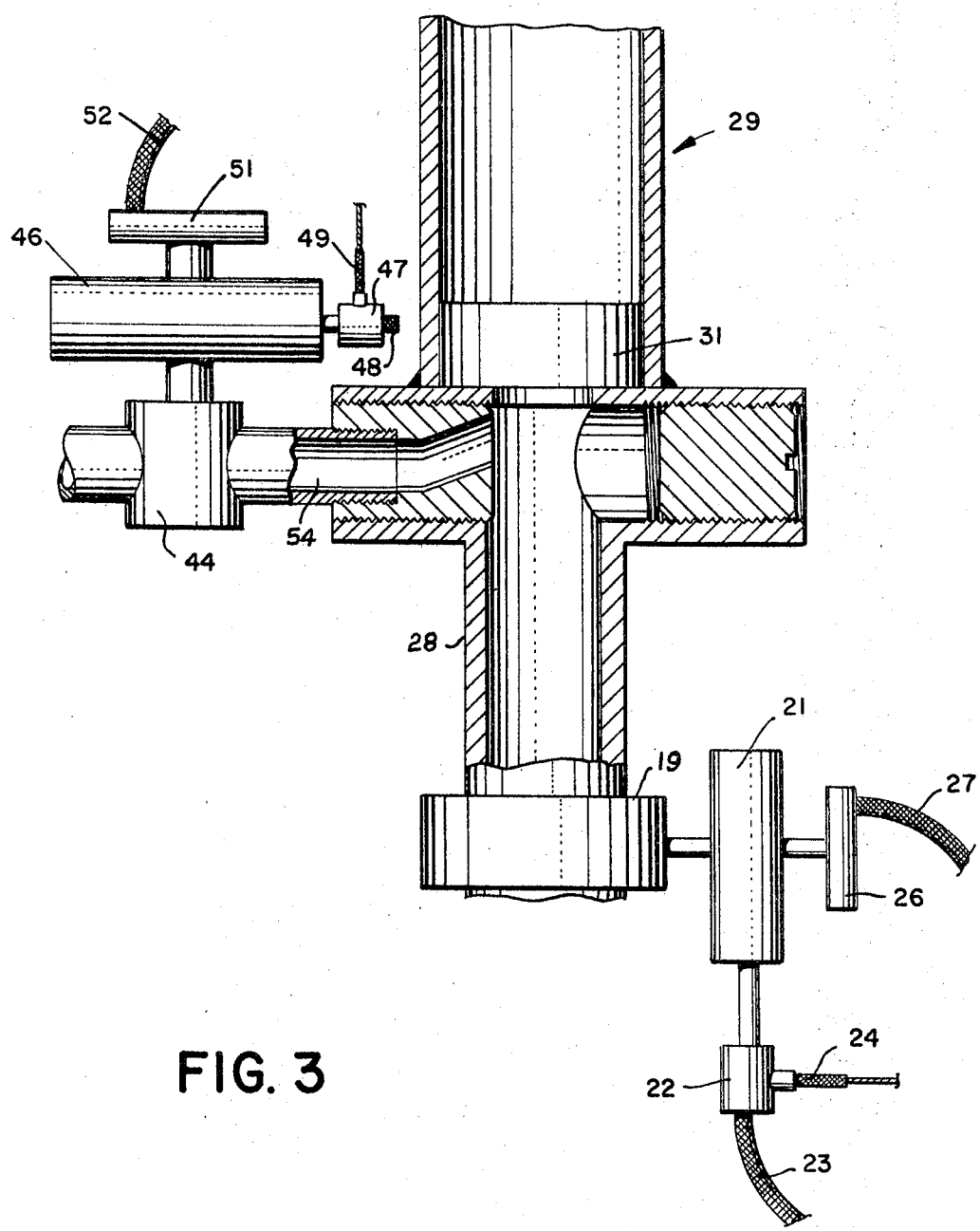
FIG. 3 is a modified form of exhaust valve for use in conjunction with the apparatus of FIG. 1.

FIG. 3 shows one embodiment of the discharge valve arrangement to prevent air from being trapped in the system. The flow of discharge material is the same as in the corresponding section of the apparatus of FIG. 1 but the parts are simply physically located differently. The cylinder filling valve 19 with its associated control apparatus is located beneath the discharge chamber 29 with the pipe 28 extending directly upwardly toward the chamber. Any air carried into that part of the apparatus would tend to rise to the top of the pipe 28 and accumulate directly under the piston 31. The cylinder emptying valve 44 is connected to a pipe 54 that leads from the side and terminates directly beneath the piston 31, thus permitting any air trapped in this region to be discharged directly through the valve 44. This minimizes the chance of having trapped air affect the operation of the discharge chamber since, at most, only a very small quantity of air could be trapped, not enough to make any significant difference in the operation if the air became compressed. Since all of the components of this portion of the system are the same as the correspondingly numbered parts shown in FIG. 1, the operation of these components need not be described again.

While this invention has been described in terms of a specific embodiment, it will be understood by those skilled in the art that modification can be made therein without departing from the true scope of the invention.

What is claimed is:

1. Apparatus for removing a discharge from a high pressure chamber, said apparatus comprising: an outlet channel connected to said high pressure chamber to receive said discharge; an unloading chamber; said outlet channel interconnecting said high pressure chamber and said unloading chamber, a discharge channel communicating with said unloading chamber to receive said discharge therefrom; valve means connected to said outlet channel and said discharge channel to connect said high pressure chamber to said discharge chamber by providing free passage from said high pressure chamber through said outlet channel into said unloading chamber while simultaneously preventing unloading of said unloading chamber through said discharge chamber, said valve means alternatively providing a closed passage in said outlet channel between said high pressure chamber and said unloading chamber to disconnect said high pressure chamber from said unloading chamber and permit unloading of said unloading chamber through said discharge channel; and pressure control means acting on said unloading chamber to regulate the volume thereof, said pressure means providing a lower pressure than the pressure in said high pressure chamber whereby the pressure in said high pressure chamber forces said discharge into said unloading chamber in spite of said positive pressure means when said valve means connects said high pressure chamber to said unloading chamber, said pressure means reducing the space of said unloading chamber when said valve means connects said unloading chamber to said discharge channel to force said discharge therethrough.

2. The apparatus of claim 1 wherein said valve means comprises a first valve connected to said outlet channel and a second valve connected to said discharge channel, said apparatus further including sensing means operatively connected to said pressure control means to sequentially open and close said first and second valves.

3. Apparatus according to claim 1 in which: said unloading chamber comprises a cylinder having a piston therein and said outlet channel is connected to one end of said cylinder, the space in said cylinder between said end and said piston comprising said receiving chamber; and said pressure control means comprises a controllable supply of fluid under pressure connected to the other end of cylinder to apply pressure to said cylinder.

4. Apparatus for removing discharge slurry from a high pressure chamber said apparatus comprising: an unloading cylinder; an outlet channel connecting said high pressure chamber to one end of said cylinder to transmit the slurry under pressure from said chamber to said cylinder, a first valve connected in said channel between said high pressure chamber and said unloading cylinder to control the flow of the slurry through said outlet channel; a discharge channel connected to said end of said unloading cylinder to receive the slurry from said cylinder; a second valve connected in said discharge channel to control the flow of slurry therethrough; a piston movable within said cylinder; a fluid supply line connected to the other end of said cylinder to transmit the low pressure fluid to said cylinder; a check valve connected in said supply line to permit said fluid to flow therethrough only in the direction toward said cylinder; a fluid outlet line connected to said other end of said cylinder; and a pressure control valve in said outlet line to permit said fluid to flow therethrough when the pressure on the side of said piston facing said one end of said cylinder is substantially equal to the pressure in said high pressure chamber.

References Cited
UNITED STATES PATENTS
3,001,652    9/1961    Schroeder et al. _____ 214—17.8

FOREIGN PATENTS
87,672    3/1958    Netherlands.

JAMES H. TAYMAN, Jr., Primary Examiner

U.S. Cl. X.R.

23—252; 214—17; 222—334; 302—36